(12) United States Patent  
Stauffer et al.

(10) Patent No.: US 7,370,542 B2  
(45) Date of Patent: May 13, 2008

(54) FLAT BELT DURABILITY TESTER

(75) Inventors: David B. Stauffer, New Holland, PA (US); George Korlinchak, New Holland, PA (US)

(73) Assignee: CNH America LLC, New Holland, PA (US)

( * ) Notice: Subject to any disclaimer, the term of this patent is extended or adjusted under 35 U.S.C. 154(b) by 122 days.

(21) Appl. No.: 11/483,430

(22) Filed: Jul. 10, 2006

(65) Prior Publication Data

US 2008/0006097 A1   Jan. 10, 2008

(51) Int. Cl.
   *G01L 1/04* (2006.01)

(52) U.S. Cl. .............................. 73/862.453; 73/7; 73/8; 73/118.1; 73/812

(58) Field of Classification Search ................ 73/7, 73/8, 118.1, 812, 862.453
   See application file for complete search history.

(56) References Cited

U.S. PATENT DOCUMENTS

| | | | |
|---|---|---|---|
| 1,749,297 A * | 3/1930 | Norman | 73/7 |
| 1,954,483 A | 4/1934 | Krall | |
| 2,603,084 A | 7/1952 | Waddell | |
| 3,739,632 A * | 6/1973 | Miller et al. | 73/7 |
| 3,908,448 A * | 9/1975 | Jardine et al. | 73/810 |
| 3,956,929 A | 5/1976 | Jenkins, III et al. | |
| 4,235,091 A * | 11/1980 | Takano et al. | 73/7 |
| 4,237,719 A | 12/1980 | Takano | |
| 4,240,283 A | 12/1980 | Takano et al. | |
| 4,841,783 A * | 6/1989 | Marshek et al. | 73/862.042 |
| 5,307,672 A * | 5/1994 | Macchiarulo et al. | 73/118.1 |
| 5,351,530 A * | 10/1994 | Macchiarulo et al. | 73/118.1 |
| 7,059,984 B2 * | 6/2006 | Vaeth | 474/101 |

* cited by examiner

*Primary Examiner*—Edward Lefkowitz
*Assistant Examiner*—Freddie Kirkland, III
(74) *Attorney, Agent, or Firm*—Patrick M. Sheldrake; John William Stader; Michael C. Harms

(57) ABSTRACT

The apparatus is a multi-speed flat belt durability tester that can simultaneously test several belts of different lengths. The tester can apply different tensions to each belt with a tension pulley powered by a hydraulic cylinder, and it monitors the tracking of the belts with photocell sensors. At least two belt test positions located at the outer edges of the apparatus include cantilevered pulley ends that greatly facilitate installation and removal of the belts being tested.

11 Claims, 3 Drawing Sheets

FLAT BELT DURABILITY TESTER

BACKGROUND OF THE INVENTION

This invention deals generally with an apparatus for testing power transmission belts and more specifically for a machine for life testing of flat belts of substantially different lengths.

Numerous power transmission belts are used on farm machinery, and there can even be six to eight belts on a single machine. Although such belts are usually thin flat belts, they can be either true "endless" belts or so called "laced" belts, those that have a spliced junction forming the loop. Field test evaluation of the performance of such belts under normal operation in crop conditions can take years. Furthermore, because of the width of such belts, which are up to a foot wide, the pulleys they ride upon are typically supported at both ends, making installation and removal of such belts very cumbersome and time consuming.

Several belt testing machines are patented, but all such devices have some shortcomings. For one thing most are designed for the common narrow "V" belt, or at least a belt in which the width is comparable to its thickness. This makes installation and removal of the belt relatively simple and reduces the problem of those belts drifting sideways on pulleys. Another aspect of the available testers is that they test one belt at a time.

For life testing wide flat belts it would be very advantageous to have available a machine which facilitates installation and removal of the belts, tests both endless and laced belts, and simultaneously tests several belts of different length.

SUMMARY OF THE INVENTION

The present invention durability tests wide, thin, flat belts, and it can simultaneously test up to three belts that need not be of identical length. The preferred embodiment of the invention tests belts from 343 inch to 420 inches in loop length, and can be adjusted for intermediate lengths. Although one of the three belt test positions is limited to a laced belt, the other two positions can test belts of either endless or laced design. The limitation on the one belt exists because the three belts are positioned side by side. Thus, while the outer two belts are essentially supported by cantilevered pulleys that permit easy belt installation and removal, the center belt is trapped between vertical support structures that can not be easily disassembled. This therefore requires that the center belt be a laced belt that itself can be disassembled for installation.

Several variable parameters are available to change test conditions to accelerate belt wear. One such parameter is speed variation. Although a fixed speed electric motor is used to drive the belts, two different sets of pulleys are available to change the belt speed to speeds greater than those experienced under field conditions. The test time is also reduced by increasing belt tensions. This is accomplished with an idler pulley forced against each belt by a hydraulic cylinder, with a linear variable displacement transducer monitoring the belt stretch, and with a pressure transducer monitoring the belt tension.

The preferred embodiment of the invention also includes adjustable guide pulleys installed on each side of each belt at both ends of the machine. These adjustable guide pulleys gently hold the belt on track without generating heat or belt edge degradation. However, if a belt travels too far sideways on a guide pulley, the movement is sensed by a photocell sensor, and the test machine is shutdown.

An additional feature of the machine is that it includes both "inside-wrap" pulleys that contact the belt surface that usually contacts pulleys and "outside-wrap" pulleys that can be placed in contact with the outside of the belts to add wear and shear stress to that side of the belts and better simulate field conditions.

The present invention can thereby simulate and even accelerate the wear conditions on flat belts used in various applications, and it provides significant information to predict belt performance under field conditions.

DETAILED DESCRIPTION OF THE INVENTION

Figure 1:
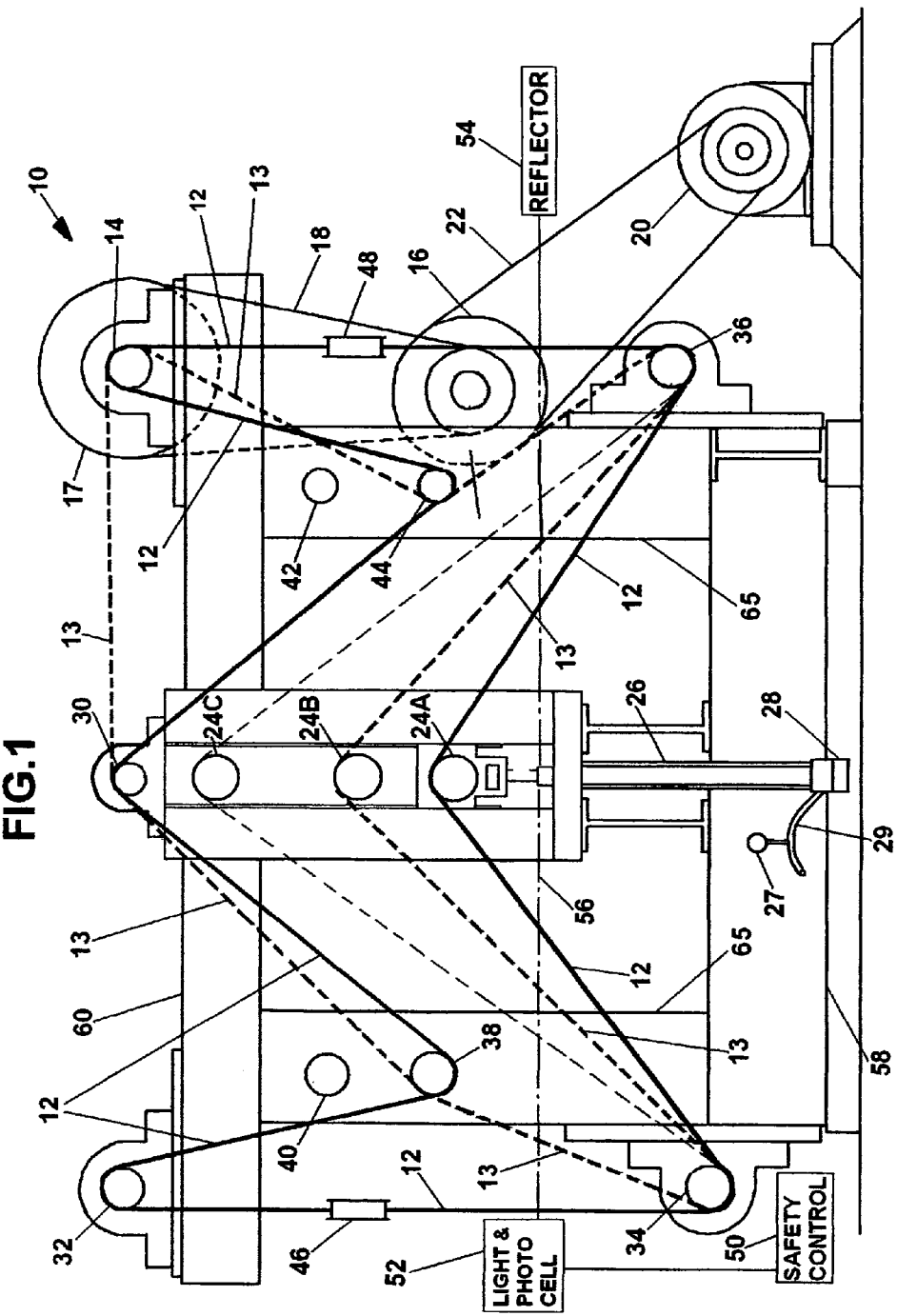
FIG. 1 is a schematic side view of the preferred embodiment of the invention.
Figure 2:
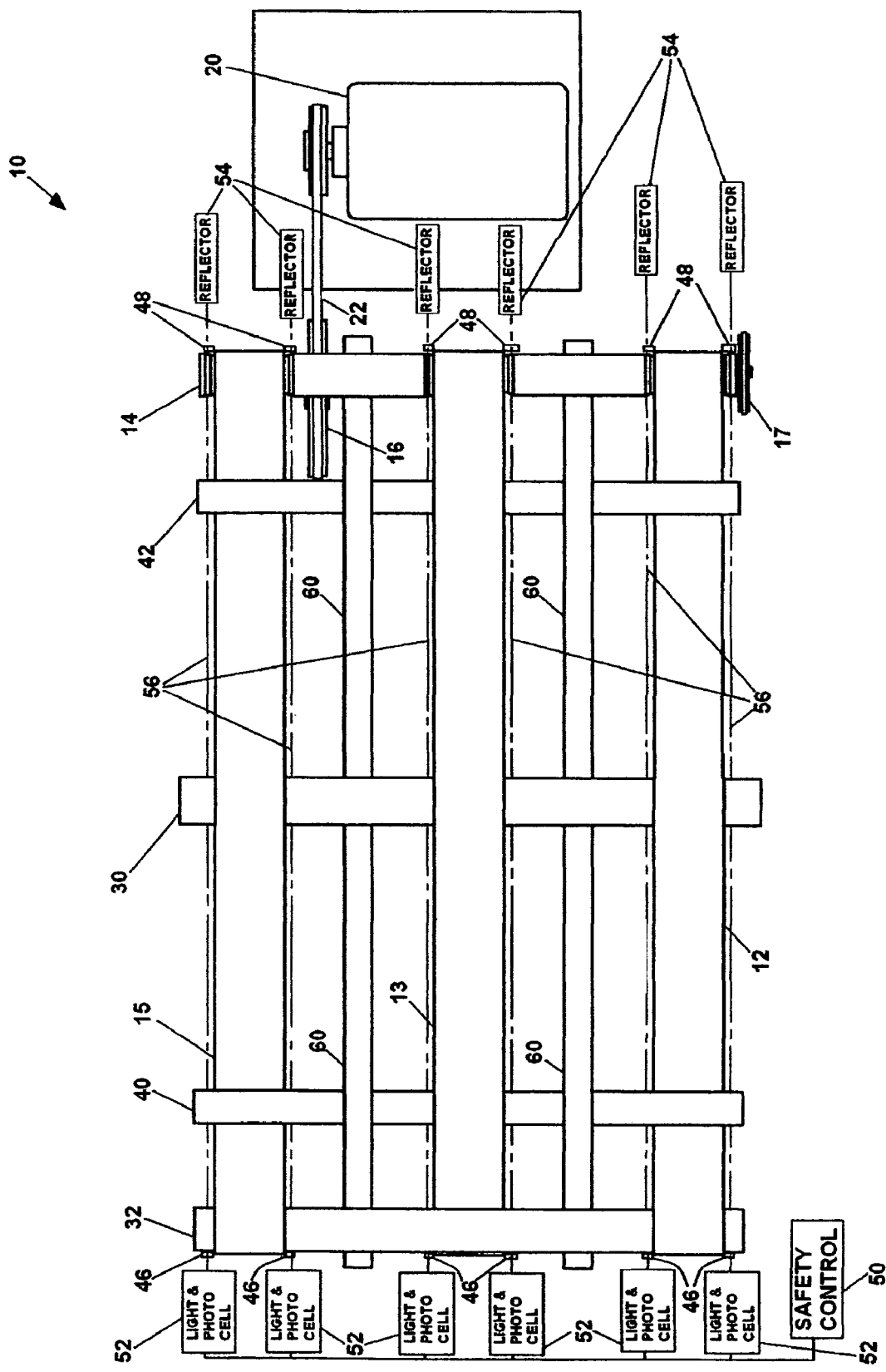
FIG. 2 is a schematic top view of the preferred embodiment of the invention.

FIG. 1 is a schematic side view of flat belt tester 10 of the preferred embodiment of the invention, and FIG. 2 is a schematic top view of belt tester 10 of the preferred embodiment of the invention. Only a limited part of the support structure of tester 10 is shown in FIGS. 1 and 2 in order to more clearly show the locations and orientations of the various pulleys and the belts being tested. Furthermore, since FIG. 1 is a side view only a single belt 12 would normally be seen in that view. FIG. 2, which is a schematic top view of tester 10, shows the location of all three belts that can be tested simultaneously. As is also more clearly shown in FIG. 2, most of the pulleys whose ends are shown in FIG. 1 extend for the entire width of tester 10 and can, but most need not always, be used for all the belts being tested.

FIG. 1 also shows the manner in which belts of two different sizes can be tested. Belt 12, indicated as a dark solid line, shows the path of a 420 inch belt installed on the near outer location of tester 10. Belt 13 shown in FIG. 2 as installed in the center position of tester 10, is indicated as a dark dashed line and shows the path for a 343 inch belt. Paths of various other lengths are also possible with the depicted selection of adjustable pulley locations. Belts 12, 13 and 15 are shown in FIG. 2 to more clearly show the positions of three belts when they are being tested simultaneously on tester 10.

Drive pulley 14 is one pulley that all the test belts must contact, because drive pulley 14 powers the movement of all the belts. Drive pulley 14 is powered from speed change apparatus 16 by belt 18, and speed change apparatus 16 is driven by electric motor 20 through belt 22. Drive pulley 14 has a second speed change apparatus 17 to permit even greater variation in the speeds for testing belts. Drive pulley 14 also includes conventional smaller diameter "crown" sections upon which each test belt is located. This "crown" structure aids in maintaining the belts in their positions on belt tester 10.

The other vital pulleys for all belts are the tension pulleys. There is an independent tension pulley for each belt being tested, and each tension pulley applies suitable tension for testing its own belt. As shown in FIG. 1 tension pulley 24A is located between idler pulleys 34 and 36 on belt 12, and positioned to contact the opposite surface of belt 12 from the surface contacted by the idler pulleys 34 and 36. The tension is thereby adjusted by moving hydraulic cylinder 26 to place the tension pulley in an appropriate position, three of which are shown in FIG. 1 and labeled 24A, 24B, and 24C. These positions are monitored by linear variable displacement transducers 28 attached to each hydraulic cylinder 26, and they permit data to be acquired and recorded continuously for each belt. The reading from each linear variable displacement transducer 28 along with concurrent hydraulic pressure reading from each pressure transducer 27 in hydraulic line 29 permits calculation of the belt tension.

Additional idler pulleys 30, 32, 38, 40, 42, and 44 are located throughout the tester 10 to provide possible belt length variations and to contact the outside surfaces of test belts. As shown in FIG. 1 for belt 12 idler pulleys 14, 30, 32, 34, and 36 are "inside-wrap" pulleys that contact the surface of belt 12 that usually contacts drive pulleys, and idler pulleys 24A, 38, and 44 are "outside-wrap" pulleys for belt 12 that are in contact with the outside of the belt to add wear and shear stress to that side of the belt.

FIG. 1 also shows the vertical locations, but not the support structure, of guide pulley sets 46 and 48. These pulley sets, the horizontal orientation of which is shown in FIG. 2, are shown in greater detail in FIG. 3. Guide pulley sets 46 and 48 are actually each a pair of pulleys installed at the ends of tester 10 and located along opposite edges of each belt. Thus, there are actually six sets of guide pulleys totaling twelve pulleys. Guide pulleys 46 and 48 are supported by ball bearings and gently hold the belt on track without generating heat or degradation of the edges of the belts. The guide pulleys are constructed with low end flanges separated by a wide flat section that permits a belt to move sideways on the guide pulley and buckle along the edge if the misalignment is too great. Under such circumstances, belt safety control 50 takes over.

Belt safety control 50 supplements the guide pulleys in that it stops belt tester 10 when any test belt moves off track by a prescribed distance. Belt safety control 50 includes two light sources and photocell alignment sensors 52 and light reflectors 54 for each belt. This arrangement is best viewed in FIG. 2. There is one light source and alignment sensor 52 at one end of belt tester 10 and one light reflector 54 at the other end of belt tester 10 located on each side of each belt being tested. All the alignment sensors 52 are interconnected to safety control 50, and each alignment sensor 52 is aligned with a light reflector 54 along a light sight line 56 that parallels the belt path. Thus, if any belt moves more than a prescribed distance off track to cross a light sight line 56, the light signal to the appropriate photocell alignment sensor 52 is broken and belt safety control 50 stops belt tester 10. Of course, a similar arrangement can be constructed with the light source located where reflector 54 is shown. In that case light sight line 56 originates at the opposite end of belt tester 10 rather than adjacent to the photocell alignment sensor.

It should be appreciated that lower support beam 58, vertical support beams 65, and upper support beams 60 are shown in FIGS. 1 and 2 to emphasize a very important structural feature of tester 10. Almost all of the pulleys contacting belts 12 and 13 are constructed as cantilevered out from support beams 58, 60, and 65. This permits very simple installation of test belts in these outer locations, because they can simply be slipped over the exposed pulleys.

Figure 3:
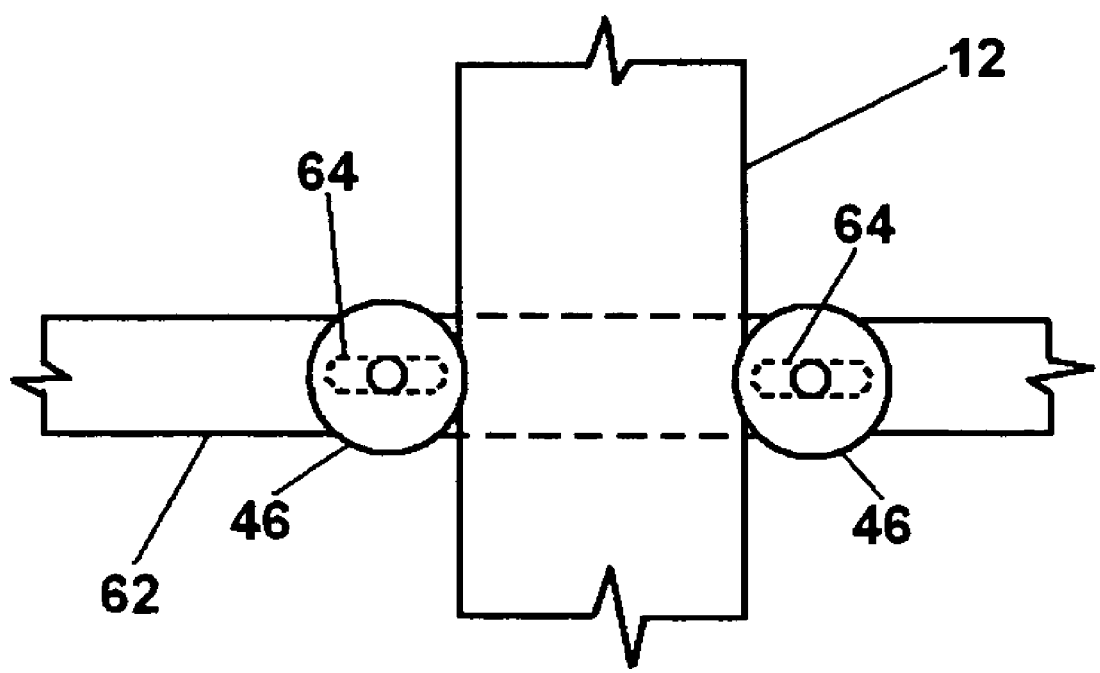
FIG. 3 is a schematic side view of a pair guide pulleys that limit the sideways drift of the belts being tested.

FIG. 3 is a schematic side view of a pair guide pulleys 46 (and 48) that limit the sideways drift of the belts being tested. Unlike the other pulleys on tester 10, guide pulleys 46 and 48 are located in the same vertical planes as the test belts and aligned with the belt edges. Therefore, they only contact the edges, not the flat surfaces, of belt 12, or any of the other belts for which they serve as guides. However, even that edge contact is not actually required. Pulleys 14, 32, and 24A are constructed with "crown" structures, the smaller diameter sections upon which the belts usually run, so that the belts will stay quite well centered on the pulleys. Nevertheless, the guide pulleys are installed to limit sideways drift of the belts, and, ideally, guide pulleys 46 and 48 would never actually exert any significant force on the belt. Thus, guide pulleys 46 and 48 gently hold the belt on track without generating heat or belt edge degradation for normal belt tracking. All the guide pulleys are installed on supports similar to support 62 and within slots 64 that permit adjustment for the running position and the width of the belt being tested. As previously described in regard to FIG. 2, if any test belt drifts too far sideways, belt safety control 50 stops tester 10 before any damage occurs.

The belt tester of the invention thereby furnishes a valuable durability test for flat belts that simulate and even accelerate field conditions. Furthermore, it permits changing endless belts by one operator in less than 30 minutes as opposed to field test belt changes that can take hours and require several operators. The invention can also be safely operated unattended on a continuous 24 hour a day schedule, and, by virtue of its linear variable displacement and hydraulic pressure transducers can offer continuous data acquisition. It has, in fact, tested belts that failed in as few as 30 hours, and operated others for 700 hours without failure.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, belt tester 10 could be constructed to test only a single belt at a time, but can also include additional internal test positions for laced belts. Furthermore, belt tester 10 can have additional or fewer idler pulleys to permit testing larger or smaller belts.

What is claimed as new and for which Letters patent of the United States are desired to be secured is:

1. A flat belt tester comprising:
   a support structure;
   a drive pulley mounted on the support structure and imparting motion to at least one test belt, with the ends of the drive pulley extending out from the support structure as a cantilever structure to permit installing the at least one test belt on an exposed end of the drive pulley;
   a motor interconnected to and rotating the drive pulley; and
   at least a first idler pulley and a second idler pulley mounted on the support structure, with the drive pulley, first idler pulley, and second idler pulley in contact with each test belt, with each test belt moved on a continuous path over the idler pulleys and the drive pulley, and with the ends of the idler pulleys extending out from the support structure as cantilever structures to permit installing the at least one test belt on exposed ends of the idler pulleys.

2. The belt tester of claim 1 further including a tension pulley on each belt path supported by an adjusting apparatus mounted on the support structure, with the adjusting apparatus capable of moving the tension pulley, and with the tension pulley located between the first and second idler pulleys on the path of each belt, and positioned to contact the surface of each belt opposite from the surface contacted by the first and second idler pulleys.

3. The belt tester of claim 2 further including a displacement transducer interconnected with and monitoring the position of the tension pulley adjusting means.

4. The belt tester of claim 2 wherein the tension pulley adjusting means is a hydraulic cylinder and a hydraulic pressure transducer is interconnected with and monitors the hydraulic pressure applied to the hydraulic cylinder.

5. The belt tester of claim 2 wherein the tension pulley adjusting means is a hydraulic cylinder, a hydraulic pressure transducer is interconnected with and monitors the hydraulic pressure applied to the hydraulic cylinder, a displacement transducer is interconnected with and monitors the position of the hydraulic cylinder, and the hydraulic pressure transducer and the displacement transducer provide data to calculate the belt tension.

6. The belt tester of claim 2 further including a linear variable displacement transducer interconnected with and monitoring the position of the tension pulley adjusting means.

7. The belt tester of claim 1 further including additional idler pulleys to vary the belt path length, with the ends of the additional idler pulleys extending out from the support structure as cantilever structures to permit installing the at least one test belt on exposed ends of the idler pulleys.

8. The belt tester of claim 1 further including at least one pair of guide pulleys, with the guide pulleys oriented in the same plane as a test belt, aligned with the edges of the test belt, and restricting the sideways movement of the test belt.

9. The belt tester of claim 1 wherein the motor is interconnected with the drive pulley through a speed adjustment apparatus.

10. The belt tester of claim 1 further including a belt safety control that stops the belt tester when any test belt moves off track by a prescribed distance.

11. The belt tester of claim 1 further including a belt safety control that stops the belt tester when any test belt moves off track by a prescribed distance, and the belt safety control includes a photocell alignment sensor located on each side of each belt being tested, with each alignment sensor aligned with a light source along a light sight line that parallels the belt path and all the alignment sensors are interconnected with the safety control.

* * * * *